United States Patent Office 3,062,849
Patented Nov. 6, 1962

3,062,849
2-FORMYL-$\Delta^2$-9$\alpha$,11$\beta$-DISUBSTITUTED ANDROSTANE DERIVATIVES
Albert Bowers, John Edwards, and James C. Orr, Mexico City, Mexico, assignors, by mesne assignments, to Syntex Corporation, a corporation of Panama
No Drawing. Filed Dec. 19, 1961, Ser. No. 160,632
15 Claims. (Cl. 260—397.45)

The present invention relates to novel cyclopentanophenanthrene derivatives and to a process for the production thereof.

More particularly the present invention relates to 2-formyl-$\Delta^2$-9$\alpha$,11$\beta$-disubstituted androstane derivatives.

The novel compounds of the present invention are represented by the following formula:

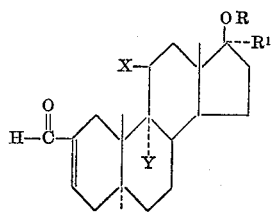

In the above formula X may be hydroxyl, fluorine or cholorine; Y represents fluorine, chlorine or bromine; R may be hydrogen or a hydrocarbon carboxylic acyl group of less than 12 carbon atoms; $R^1$ represents hydrogen, lower alkyl, lower alkenyl or lower alkynyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The compounds represented by the above formula are strong appetite stimulants and anabolic-androgenic agents with a favorable anabolic ratio. In addition the novel compounds exhibit anti-estroganic and anti-gonadotrophic activities and lower the cholesterol level in blood serum and liver.

The compounds represented by the above formula wherein $R^1$ represents lower alkenyl or lower alkynyl in addition to the foregoing properties, exhibit progestational activity.

The novel compounds of the present invention are prepared by the process exemplified by the following equation:

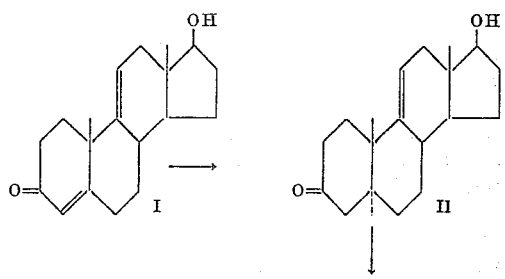

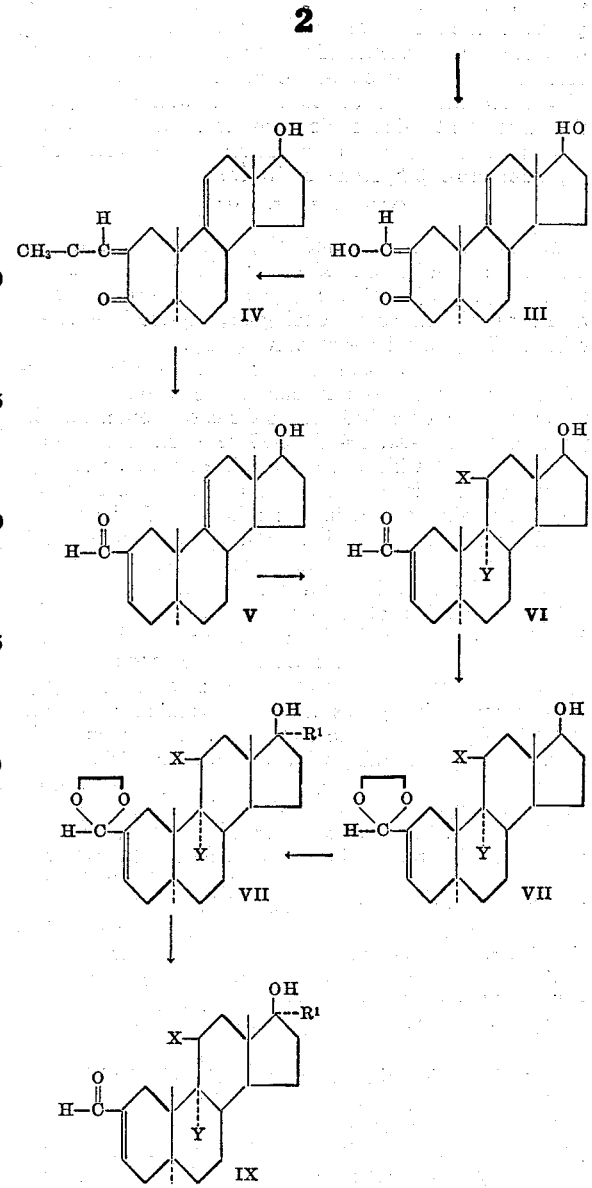

In the above formulas X, Y and $R^1$ have the same meaning as previously set forth In practicing the process outlined above the starting 9(11)-dehydrotestosterone (I) is reduced with an alkali metal such as lithium in liquid ammonia and a proton donor such as ammonium chloride to afford $\Delta^{9(11)}$-androsten-17$\beta$-ol-3-one (II). This compound upon treatment with ethyl formate in the presence of an alkali metal hydride, preferably sodium hydride and subsequent acid hydrolysis of the formed sodio salt, yields 2-hydroxymethylene-$\Delta^{9(11)}$-androsten-17$\beta$-ol-3-one (III). Reaction of this compound with a methylating agent, preferably diazomethane affords 2-methoxymethylene-$\Delta^{9(11)}$-androsten-17$\beta$-ol-3-one (IV). Reduction of the 3-keto group and acid hydrolysis of the resulting 3-hydroxy compound furnishes 2-formyl-$\Delta^{2,9(11)}$-androstadien-17$\beta$-ol (V). Upon treatment of this compound with a positive halogen ion-negative halogen ion couple, which may be a halogen halide generated in situ from an N-halo-amide-hydrogen halide mixture, there is formed the corresponding 9α,11β-dihalo compound (VI) wherein the positive ion is at 9α position. For example, treatment with N-bromoacetamide-hydrogen fluoride gives the 9α-bromo-11β-fluoro derivative (VI: Y=Br, X=F); treatment with N-chlorosuccinimide-hydrogen fluoride yields the 9α-chloro-11β-fluoro derivative (VI: Y=Cl, X=F).

Following a second sequence of reactions the $\Delta^{2,9(11)}$-androstadiene derivative (V) is treated with N-bromosuccinimide in the presence of perchloric acid to furnish the corresponding 9α-bromo-11β-hydroxy derivative (VI: Y=Br, X=OH) which upon treatment with a base yields the respective 9β,-11β-oxido compound. Opening of the oxide ring with hydrogen fluoride affords the corresponding 9α-fluoro-11β-hydroxy derivative (VI: Y=F, X=OH).

Treatment of a compound selected from the above obtained 9α,11β-disubstituted 2-formyl-$\Delta^2$-androstene derivatives (VI) with ethylene glycol in the presence of an acid furnishes the corresponding 9α, 11β-disubstituted-2-ethylenedioxymethyl-$\Delta^2$-derivative (VII).

Oxidation of the 2-ethylenedioxymethyl-9α,11β-dihalo-17β-ol derivatives (VII: X and Y are halogens of the type previously described) yields the corresponding 2-ethylenedioxymethyl-9α,11β-dihalo-17-keto compound which upon treatment with a lower alkyl, alkenyl, or alkynyl magnesium halide, as for example, methyl magnesium bromide or vinyl magnesium bromide, affords the respective 2-ethylenedioxymethyl-9α,11β-dihalo-17α-lower alkyl, alkenyl or alkynyl-17β-ol compound (VIII: X and Y are halogens of the previously defined type).

Upon oxidation of a 2-ethylenedioxymethyl-9α-halo-11β,17β-dihydroxy derivative (VII: X=OH) there is obtained the corresponding 11,17-diketo compound which upon treatment with a lower alkyl, alkenyl or alkynyl magnesium halide yields the corresponding 17α-substituted-17β-hydroxy-11-keto compound. Reduction of the 11-keto group preferably with sodium borohydride yields the corresponding 2-ethylenedioxymethyl-9α-halo-11β,17β-dihydroxy-17α-substituted derivative (VIII: X=OH).

Treatment of the above obtained 17α-substituted compounds, having present in the molecule the 2-ethylenedioxymethyl group, in a mild acid medium affords the corresponding 2-formyl compound (IX).

A 2-formyl-9α,11β-disubstituted-$\Delta^2$-androstene derivative described above having a secondary hydroxyl group at the 17β-position (VI) is conventionally acylated in pyridine with acylating agent as for example, acetic anhydride or propionic anhydride gives the corresponding 17β-acyloxy derivative.

The above described 2-formyl-9α,11β-disubstituted-$\Delta^2$-androstene compounds having a tertiary hydroxyl at the 17β-position (IX) are conventionally acylated in the presence of p-toluenesulfonic acid with excess acylating agent, which may be for example, the anhydride of a hydrocarbon carboxylic acid of the type defined hereinbefore, thus yielding the corresponding 17β-acyloxy derivatives.

The following specific example serve to illustrate but are not intended to limit the scope of the present invention.

*Example I*

A solution of 5 g. of 9(11)-dehydro-testosterone (Heyl et al., J. Am. Chem. Soc. 77, 488 (1955), in 100 cc. of dioxane-ether (1:1) was added in a steady stream to a solution of 0.5 g. of lithium in 500 cc. of anhydrous liquid ammonia with good stirring. At the end of the addition the blue color was discharged by the addition of 25 g. of ammonium chloride and the ammonia was allowed to evaporate. The product was extracted with ether, washed with water, dried and the ether evaporated to afford a gum which was adsorbed from 300 cc. of benzene onto 250 g. of alumina. Elution with benzene-ether afforded a product which upon recrystallization from acetone-hexane gave $\Delta^{9(11)}$-androsten-17β-ol-3-one.

*Example II*

To a solution of 3 g. of the product of Example I in 60 cc. of anhydrous benzene was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in aqueous hydrochloric acid and stirred at room temperature for half an hour. The precipitate was collected, washed with water and dried. Recrystallization from methylene-chloride-hexane gave 2-hydroxy-methylene-$\Delta^{9(11)}$-androsten-17β-ol-3-one.

*Example III*

To a solution of 3 g. of the product of Example II in 50 cc. of methylene chloride were added an excess of diazomethane in ether (obtained from nitrosomethylurea) and a few drops of methanol. The reaction mixture was kept at room temperature for 18 hours. The excess reagent was decomposed with acetic acid. The resulting mixture was poured into water, the organic layer washed to neutral and evaporated to dryness. Recrystallization from acetone-hexane afforded 2-methoxymethylene-$\Delta^{9(11)}$-androsten-17β-ol-3-one.

*Example IV*

A solution of 2 g. of sodium borohydride in 6 cc. of water was added to an ice-cooled solution of 2 g. of the product of Example III in 220 cc. of methanol and the mixture was allowed to stand for 16 hours at room temperature. The excess reagent was decomposed by addition of acetic acid, the solution was further acidified with 1 cc. of concentrated hydrochloric acid and stirred for 30 minutes at room temperature, then it was concentrated to small volume in vacuo and diluted with water. The product was extracted with ethyl acetate, the extract was washed with water, dried and evaporated. The solid residue was purified by crystallization from acetone-hexane to give 2-formyl-$\Delta^{2,9(11)}$-androstadien-17β-ol.

*Example V*

To a polyethylene bottle containing 119 g. of anhydrous tetrahydrofuran was added 70 g. of anhydrous hydrogen fluoride. The mixture was cooled to −70° C. in a Dry Ice-acetone bath and, under vigorous stirring there was added a mixture, previously cooled to −70° C., of 10 g. of 2-formyl-$\Delta^{2,9(11)}$-androstadien-17β-ol obtained according to the foregoing example, and 5.0 g. of N-bromoacetamide in 350 ml. of anhydrous methylene chloride distilled over calcium chloride. The mixture was stirred at −70° C. for 5 hours, poured into aqueous saturated sodium carbonate solution and the precipitate was filtered. The organic layer was separated, the aqueous phase was extracted with several portions of methylene chloride and the extracts were combined, washed with water to neutrality, dried over anhydrous sodium sulfate and evaporated to dryness under vacuum. The original precipitate and the residue of the evaporation were combined and crystallized from acetone, thus affording 2-formyl-9α-bromo-11β-fluoro-$\Delta^2$-androsten-17β-ol.

*Example VI*

To 120 cc. of a saturated solution of hydrogen chloride in tetrahydrofuran were added with vigorous stirring 10 g. of 2-formyl-$\Delta^{2,9(11)}$-androstadien-17β-ol obtained according to Example IV, and 5.0 g. of N-bromoacetamide in 350 ml. of anhydrous methylene chloride distilled over calcium chloride. The mixture was stirred at 0° C. for 5 hours, poured into aqueous saturated sodium carbonate solution and the precipitate was filtered. The organic layer was separated, the aqueous phase was extracted with several portions of methylene chloride and the extracts were combined, washed with water to neutrality, dried over anhydrous sodium sulfate and evaporated to dryness under vacuum. The original precipitate and the residue of the evaporation were combined and crystallized from acetone, thus affording 2-formyl-9α-bromo-11β-chloro-$\Delta^2$-androsten-17β-ol.

Example VII

Following exactly the procedure described in Example V except that N-bromoacetamide was substituted by N-chlorosuccinimide, there was obtained 2-formyl-9α-chloro-11β-fluoro-$\Delta^2$-androsten-17β-ol.

Example VIII

Following the procedure described in Example VI except that N-bromoacetamide was substituted by N-chlorosuccinimide, there was obtained 2-formyl-9α,11β-dichloro-$\Delta^2$-androsten-17β-ol.

Example IX 2.8 g. of N-bromoacetamide were added to a mixture of 5 g. of 2-formyl-$\Delta^{2,9(11)}$-androstadien-17β-ol, 50 cc. of pure dioxane and 0.8 cc. of 0.4 N perchloric acid while stirring in the dark and at room temperature during one hour. The reaction mixture was stirred for one hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained 2-formyl-9α-bromo-$\Delta^2$-androstene-11β,17β-diol.

Example X

A mixture of 2 g. of anhydrous potassium acetate and 20 cc. of acetone was heated almost to boiling and then a solution of 1.7 g. of the above bromohydrin of Example IX in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained 2-formyl-9β,11β-oxido-$\Delta^2$-androsten-17β-ol.

Example XI

In a polyethylene flask, adapted with magnetic stirrer, there was dissolved 1.8 g. of the oxido product of Example X in 30 cc. of methylene chloride, the solution was cooled to 0° C. and a solution of 2.11 g. of anhydrous hydrogen fluoride in 3.7 cc. of tetrahydrofuran cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 2-formyl-9α-fluoro-$\Delta^2$-androstene-11β, 17β-diol.

Example XII

A mixture of 10 g. of 2-formyl-9α-bromo-11β-fluoro-$\Delta^2$-androsten-17β-ol, 250 cc. of dry benzene, 50 cc. of ethylene glycol and 500 mg. of p-toluenesulfonic acid monohydrate was refluxed for 16 hours using a water separator. It was then washed with a sodium bicarbonate solution, water and subsequently dried and evaporated to dryness. Recrystallization from acetone-hexane yielded 2 - ethylenedioxymethyl - 9α - bromo - 11β - fluoro - $\Delta^2$-androsten-17β-ol.

Example XIII

2 - formyl - 9α - bromo - 11β - chloro - $\Delta^2$ - androsten-17β - ol, 2 - formyl - 9α - chloro - 11β - fluoro - $\Delta^2$ - androsten - 17β - ol, 2 - formyl - 9α,11β - dichloro - $\Delta^2$ - androsten-17β-ol and 2-formyl-9α-fluoro-$\Delta^2$-androsten-11β, 17β-diol were treated following the technique described in the foregoing example affording correspondingly 2-ethylenedioxymethyl - 9α - bromo - 11β - chloro - $\Delta^2$-androsten - 17β - ol, 2 - ethylenedioxymethyl - 9α - chloro-11β - fluoro - $\Delta^2$ - androsten - 17β - ol, 2 - ethylenedioxymethyl-9α,11β-dichloro-$\Delta^2$-androsten-17β-ol and 2-ethylenedioxymethyl-9α-fluoro-$\Delta^2$-androsten-11β,17β-diol.

Example XIV

A solution of 6 g. of 2-ethylenedioxymethyl-9α-bromo-11β-fluoro-$\Delta^2$-androsten-17β-ol in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 2-ethylenedioxymethyl-9α-bromo-11β-fluoro-$\Delta^2$-androsten-17-one.

Following the same procedure there were treated 2-ethylenedioxymethyl-9α-bromo - 11β - chloro - $\Delta^2$ - androsten-17β-ol, 2-ethylenedioxymethyl - 9α - chloro-11β-fluoro-$\Delta^2$-androsten-17β-ol, 2-ethylenedioxymethyl - 9α, 11β-dichloro-$\Delta^2$-androsten-17β-ol and 2-ethylenedioxymethyl-9α-fluoro-$\Delta^2$-androsten-11β,17β-diol, yielding respectively 2-ethylenedioxymethyl-9α-bromo-11β-chloro-$\Delta^2$-androsten-17-one, 2-ethylenedioxymethyl-9α - chloro-11β-fluoro-$\Delta^2$-androsten-17-one, 2 - ethylenedioxymethyl-9α,11β-dichloro-$\Delta^2$-androsten-17-one and 2-ethylenedioxymethyl-9α-fluoro-$\Delta^2$-androsten-11,17-dione.

Example XV

A solution of 5 g. of 2-ethylenedioxymethyl-9α-bromo-11β-fluoro-$\Delta^2$-androsten-17-one in 250 cc. of thiophene-free benzene was treated with 27.5 cc. of 4 N methyl-magnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 2-ethylenedioxymethyl-9α-bromo-11β-fluoro-17α-methyl-$\Delta^2$-androsten-17β-ol.

The starting compounds listed below were treated with the indicated magnesium bromide following the above technique, thus yielding the corresponding products hereinafter disclosed.

| Starting compound | Grignard reagent | Product |
|---|---|---|
| 2-ethylenedioxymethyl-9α-bromo-11β-fluoro-$\Delta^2$-androsten-17-one. | Vinyl magnesium bromide. | 2-ethylenedioxymethyl-9α-bromo-11β-fluoro-17α-vinyl-$\Delta^2$-androsten-17β-ol. |
| Do | Ethinyl magnesium bromide. | 2-ethylenedioxymethyl-9α-bromo-11β-fluoro-17-α-ethinyl-$\Delta^2$- androsten-17β-ol. |
| 2-ethylenedioxymethyl-9α-bromo-11β-chloro-$\Delta^2$-androsten-17-one. | Methyl magnesium bromide. | 2-ethylenedioxymethyl-9α-bromo-11β-chloro-17α-methyl-$\Delta^2$-androsten-17β-ol. |
| Do | Vinyl magnesium bromide. | 2-ethylenedioxymethyl-9α-bromo-11β-chloro-17α-vinyl-$\Delta^2$-androsten-17β-ol. |
| Do | Ethinyl magnesium bromide. | 2-ethylenedioxymethyl-9α-bromo-11β-chloro-17α-ethiny.-$\Delta^2$-androsten-17β-ol. |
| 2-ethylenedioxymethyl-9α-chloro-11β-fluoro-$\Delta^2$-androsten-17-one. | Methyl magnesium bromide. | 2-ethylenedioxymethyl-9α-chloro-11β-fluoro-17α-methyl-$\Delta^2$-androsten-17β-ol. |
| Do | Vinyl magnesium bromide. | 2-ethylenedioxymethyl-9α-chloro-11β-fluoro-17α-vinyl-$\Delta^2$-androsten-17β-ol. |

| Starting compound | Grignard reagent | Product |
|---|---|---|
| 2-ethylenedioxy-methyl-9α-bromo-11β-chloro-$\Delta^2$-androsten-17-one. | Vinyl magnesium bromide. | 2-ethylenedioxymethyl-9α-chloro-11β-fluoro-17α-vinyl-$\Delta^2$-androsten-17β-ol. |
| 2-ethylenedioxy methyl-9α,11β-dichloro-$\Delta^2$-androsten-17-one. | Methyl magnesium bromide. | 2-ethylenedioxymethyl-9α,11β-dichloro-17α-methyl-$\Delta^2$-androsten-17β-ol. |
| Do | Vinyl magnesium bromide. | 2-ethylenedioxymethyl-9α,11β-dichloro-17α-vinyl-$\Delta^2$-androsten-17β-ol. |
| Do | Ethinyl magnesium bromide. | 2-ethylenedioxymethyl-9α,11β-dichloro-17α-ethinyl-$\Delta^2$-androsten-17β-ol. |
| 2-ethylenedioxy-methyl-9α-fluoro-$\Delta^2$-androsten-11,17-dione. | Methyl magnesium bromide. | 2-ethylenedioxymethyl-9α-fluoro-17α-methyl-$\Delta^2$-androsten-17β-ol-11-one. |
| Do | Vinyl magnesium bromide. | 2-ethylenedioxymethyl-9α-fluoro-17α-vinyl-$\Delta^2$-androsten-17β-ol-11-one. |
| Do | Ethinyl magnesium bromide. | 2-ethylenedioxymethyl-9α-fluoro-17α-ethinyl-$\Delta^2$-androsten-17β-ol-11-one. |

*Example XVI*

2-ethylenedioxymethyl-9α-fluoro - 17α - methyl - $\Delta^2$-androsten - 17β - ol - 11 - one, 2 - ethylenedioxymethyl - 9α fluoro-17α-vinyl-$\Delta^2$ - androsten - 17β-ol-11-one, and 2-ethylenedioxymethyl-9α-fluoro-17α-ethinyl-$\Delta^2$- androsten-17β-ol-11-one were reduced with sodium borohydride following the technique described in Example IV with the exception that the reaction mixture was not acidified, thus furnishing correspondingly 2-ethylenedioxymethyl - 9α-fluoro-17α-methyl-$\Delta^2$-androsten - 11β,17β-diol, 2-ethylenedioxymethyl-9α-fluoro-17α-vinyl - $\Delta^2$ - androsten-11β,17β-diol, and 2 - ethylenedioxymethyl-9α-fluoro-17α-ethinyl-$\Delta^2$-androsten-11β,17β-diol.

*Example XVII*

5 g. of 2-ethylenedioxymethyl - 9α - bromo-11-fluoro-17α-methyl-$\Delta^2$-androsten-17β-ol were dissolved in 300 cc. of acetone and treated with 500 mg. of p-toluenesulfonic acid, the reaction mixture was kept at room temperature overnight. It was then poured into ice water, extracted with ethyl acetate and the organic extract washed with water to neutral, dried and evaporated to dryness. Addition of ether gave 2-formyl-9α-bromo-11β-fluoro-17α-methyl-$\Delta^2$-androsten-17β-ol.

The starting compounds listed below were treated by the same technique, thus affording the corresponding products hereinafter set forth.

| Starting compound | Product |
|---|---|
| 2-ethylenedioxymethyl-9α-bromo-11β-fluoro-17α-vinyl-$\Delta^2$-androsten-17β-ol | 2-formyl-9α-bromo-11β-fluoro-17α-vinyl-$\Delta^2$-androsten-17β-ol |
| 2-ethylenedioxymethyl-9α-bromo-11β-fluoro-17α-ethinyl-$\Delta^2$-androsten-17β-ol | 2-formyl-9α-bromo-11β-fluoro-17α-ethinyl-$\Delta^2$-androsten-17β-ol |
| 2-ethylenedioxymethyl-9α-bromo-11β-chloro-17α-methyl-$\Delta^2$-androsten-17β-ol | 2-formyl-9α-bromo-11β-chloro-17α-methyl-$\Delta^2$-androsten-17β-ol |
| 2-ethylenedioxymethyl-9α-bromo-11β-chloro-17α-vinyl-$\Delta^2$-androsten-17β-ol | 2-formyl-9α-bromo-11β-chloro-17α-vinyl-$\Delta^2$-androsten-17β-ol |
| 2-ethylenedioxymethyl-9α-bromo-11β-chloro-17α-ethinyl-$\Delta^2$-androsten-17β-ol | 2-formyl-9α-bromo-11β-chloro-17α-ethinyl-$\Delta^2$-androsten-17β-ol |
| 2-ethylenedioxymethyl-9α-chloro-11β-fluoro-17α-methyl-$\Delta^2$-androsten-17β-ol | 2-formyl-9α-chloro-11β-fluoro-17α-methyl-$\Delta^2$-androsten-17β-ol |
| 2-ethylenedioxymethyl-9α-chloro-11β-fluoro-17α-vinyl-$\Delta^2$-androsten-17β-ol | 2-formyl-9α-chloro-11β-fluoro-17α-vinyl-$\Delta^2$-androsten-17β-ol |
| 2-ethylenedioxymethyl-9α-chloro-11β-fluoro-17α-ethinyl-$\Delta^2$-androsten-17β-ol | 2-formyl-9α-chloro-11β-fluoro-17α-ethinyl-$\Delta^2$-androsten-17β-ol |
| 2-ethylenedioxymethyl-9α,11β-dichloro-17α-methyl-$\Delta^2$-androsten-17β-ol | 2-formyl-9α,11β-dichloro-17α-methyl-$\Delta^2$-androsten-17β-ol |
| 2-ethylenedioxymethyl-9α,11β-dichloro-17α-vinyl-$\Delta^2$-androsten-17β-ol | 2-formyl-9α,11β-dichloro-17α-vinyl-$\Delta^2$-androsten-17β-ol |
| 2-ethylenedioxymethyl-9α,11β-dichloro-17α-ethinyl-$\Delta^2$-androsten-17β-ol | 2-formyl-9α,11β-dichloro-17α-ethinyl-$\Delta^2$-androsten-17β-ol |
| 2-ethylenedioxymethyl-9α-fluoro-17α-methyl-$\Delta^2$-androsten-11β,17β-diol | 2-formyl-9α-fluoro-17α-methyl-$\Delta^2$-androsten-11β,17β-diol |
| 2-ethylenedioxymethyl-9α-fluoro-17α-vinyl-$\Delta^2$-androsten-11β,17β-diol | 2-formyl-9α-fluoro-17α-vinyl-$\Delta^2$-androsten-11β,17β-diol |
| 2-ethylenedioxymethyl-9α-fluoro-17α-ethinyl-$\Delta^2$-androsten-11β,17β-diol | 2-formyl-9α-fluoro-17α-ethinyl-$\Delta^2$-androsten-11β,17β-diol |

*Example XVIII*

A mixture of 1 g. of 2-formyl-9α-bromo-11β-fluoro-$\Delta^2$-androsten-17β-ol, 4 cc. of pyridine and 2 cc. of acetic anhydride was kept at room temperature overnight, poured into ice water, the formed precipitate was filtered, washed with water and dried. Crystallization from acetone-hexane gave the 17-acetate of 2-formyl-9α-bromo-11β-fluoro-$\Delta^2$-androsten-17β-ol.

By the same procedure were treated 2-formyl-9α-bromo - 11β - chloro - $\Delta^2$ - androsten-17β-ol, 2-formyl-9α-chloro - 11β-fluoro-$\Delta^2$-androsten-17β-ol, 2-formyl-9α,11β-dichloro-$\Delta^2$-androsten-17β-ol, and 2-formyl-9α-fluoro-$\Delta^2$-androsten-11β,17β-diol yielding correspondingly 17-acetate of 2-formyl-9α-bromo-11β-chloro-$\Delta^2$-androsten-17β-ol, 17-acetate of 2-formyl-9α-chloro-11β-fluoro-$\Delta^2$-androsten-17β-ol, 17-acetate of 2-formyl-9α,11β-dichloro-$\Delta^2$-androsten-17β-ol and 17-acetate of 2-formyl-9α-fluoro-$\Delta^2$-androsten-11β,17β-diol.

*Example XIX*

Following the procedure described in the foregoing example except that acetic anhydride was substituted by propionic anhydride, caproic anhydride, cyclopentylpropionic anhydride and benzoyl chloride there were correspondingly obtained the 17-propionates, 17-caproates, 17-cyclopentylpropionates and 17-benzoates of the starting compounds of the said example.

*Example XX*

A mixture of 1 g. of 2-formyl-9α-bromo-11β-fluoro-17α-methyl-$\Delta^2$-androsten-17β-ol, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave a mixture of the 17-acetate of the starting compound and the 17-acetate of 2-acetoxymethylene - 9α - bromo-11β-fluoro-17α-methyl-$\Delta^3$-androsten-17β-ol. This mixture was dissolved in 20 cc. of methanol and 5 cc. of tetrahydrofuran and was added to 5 cc. of cold 2% methanolic potassium hydroxide. The solution was kept at 0–5° C. for 1 hour and then poured into water and neutralized with dilute hydrochloric acid. Ether extraction furnished a product which after crystallization from acetone-hexane gave the pure 2 - formyl - 9α - bromo-11β-fluoro-17α-methyl-$\Delta^2$-androsten-17β-ol acetate.

The compounds listed below were treated following the above procedure, thus affording the corresponding products hereinafter set forth.

| Starting compound | Product |
|---|---|
| 2-formyl-9α-bromo-11β-fluoro-17α-vinyl-$\Delta^2$-androsten-17β-ol. | 17-acetate of 2-formyl-9α-bromo-11β-fluoro-17α-vinyl-$\Delta^2$-androsten-17β-ol. |
| 2-formyl-9α-bromo-11β-fluoro-17α-ethinyl-$\Delta^2$-androsten-17β-ol. | 17-acetate of 2-formyl-9α-bromo-11β-fluoro-17α-ethinyl-$\Delta^2$-androsten-17β-ol. |
| 2-formyl-9α-bromo-11β-chloro-17α-methyl-$\Delta^2$-androsten-17β-ol. | 17-acetate of 2-formyl-9α-bromo-11β-chloro-17α-methyl-$\Delta^2$-androsten-17β-ol. |
| 2-formyl-9α-bromo-11β-chloro-17α-vinyl-$\Delta^2$-androsten-17β-ol. | 17-acetate of 2-formyl-9α-bromo-11β-chloro-17α-vinyl-$\Delta^2$-androsten-17β-ol. |
| 2-formyl-9α-bromo-11β-chloro-17α-ethinyl-$\Delta^2$-androsten-17β-ol. | 17-acetate of 2-formyl-9α-bromo-11β-chloro-17α-ethinyl-$\Delta^2$-androsten-17β-ol. |

| Starting compound | Product |
|---|---|
| 2-formyl-9α-chloro-11β-fluoro-17α-methyl-Δ²-androsten-17β-ol. | 17-acetate of 2-formyl-9α-chloro-11β-fluoro-17α-methyl-Δ²-androsten-17β-ol. |
| 2-formyl-9α-chloro-11β-fluoro-17α-vinyl-Δ²-androsten-17β-ol. | 17-acetate of 2-formyl-9α-chloro-11β-fluoro-17α-vinyl-Δ²-androsten-17β-ol. |
| 2-formyl-9α-chloro-11β-fluoro-17α-ethinyl-Δ²-androsten-17β-ol. | 17-acetate of 2-formyl-9α-chloro-11β-fluoro-17α-ethinyl-Δ²-androsten-17β-ol. |
| 2-formyl-9α,11β-dichloro-17α-methyl-Δ²-androsten-17β-ol. | 17-acetate of 2-formyl-9α,11β-dichloro-17α-methyl-Δ²-androsten-17β-ol. |
| 2-formyl-9α,11β-dichloro-17α-vinyl-Δ²-androsten-17β-ol. | 17-acetate of 2-formyl-9α,11β-dichloro-17α-vinyl-Δ²-androsten-17β-ol. |
| 2-formyl-9α,11β-dichloro-17α-ethinyl-Δ²-androsten-17β-ol. | 17-acetate of 2-formyl-9α,11β-dichloro-17α-ethinyl-Δ²-androsten-17β-ol. |
| 2-formyl-9α-fluoro-17α-methyl-Δ²-androsten-11β,17β-diol. | 17-acetate of 2-formyl-9α-fluoro-17α-methyl-Δ²-androsten-11β,17β-diol. |
| 2-formyl-9α-fluoro-17α-vinyl-Δ²-androsten-11β,17β-diol. | 17-acetate of 2-formyl-9α-fluoro-17α-vinyl-Δ²-androsten-11β,17β-diol. |
| 2-formyl-9α-fluoro-17α-ethinyl-Δ²-androsten-11β,17β-diol. | 17-acetate of 2-formyl-9α-fluoro-17α-ethinyl-Δ²-androsten-11β,17β-diol. |

*Example XXI*

The starting compounds of the foregoing example were treated following the technique described in the same example except that acetic anhydride was substituted by propionic anhydride, caproic anhydride and cyclopentylpropionic anhydride thus furnishing the corresponding 17-propionates, 17-caproates and 17-cyclopentylpropionates.

We claim:
1. A compound of the following formula:

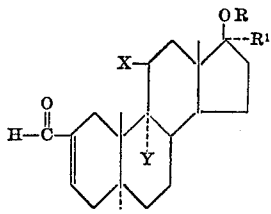

wherein X is a member of the group consisting of hydroxyl, fluorine and chlorine; Y is selected from the group consisting of fluorine, chlorine and bromine; R is a member of the group consisting of hydrogen and a hydrocarbon carboxylic acyl group of less than 12 carbon atoms and $R^1$ is selected from the group consisting of hydrogen, lower alkyl, lower alkenyl and lower alkynyl.

2. 2-formyl-9α-bromo-11β-fluoro-Δ²-androsten-17β-ol.
3. 2-formyl-9α-bromo-11β-chloro-Δ²-androsten-17β-ol.
4. 2-formyl-9α-chloro-11β-fluoro-Δ²-androsten-17β-ol.
5. 2-formyl-9α,11β-dichloro-Δ²-androsten-17β-ol.
6. 2-formyl-9α-fluoro-Δ²-androsten-11β,17β-diol.
7. 2-formyl-9α-bromo-11β-fluoro-17α-methyl-Δ²-androsten-17β-ol.
8. 2-formyl-9α-bromo-11β-chloro-17α-vinyl-Δ² - androsten-17β-ol.
9. 2-formyl-9α-chloro-11β-fluoro-17α-ethynyl-Δ²-androsten-17β-ol.
10. 2-formyl-9α,11β-dichloro-17α-methyl-Δ²-androsten-17β-ol.
11. 2-formyl-9α-fluoro-17α-methyl-Δ² - androsten - 11β,17β-diol.
12. 2-formyl-9α-fluoro-17α-ethynyl-Δ² - androsten - 11β,17β-diol.
13. The 17-esters derived from hydrocarbon carboxylic acids of less than 12 carbon atoms of 2-formyl-9α-bromo-11β-fluoro-Δ²-androsten-17α-ol.
14. The 17-esters derived from hydrocarbon carboxylic acids of less than 12 carbon atoms of 2-formyl-9α-bromo-11β-fluoro-17α-methyl-Δ²-androsten-17β-ol.
15. The 17-esters derived from hydrocarbon carboxylic acids of less than 12 carbon atoms of 2-formyl-9α-fluoro-17α-ethynyl-Δ²-androsten-11β,17β-diol.

No references cited.